United States Patent
Kwak et al.

(10) Patent No.: US 8,323,714 B2
(45) Date of Patent: Dec. 4, 2012

(54) METHOD FOR CROSSLINKING BETA-CYCLODEXTRIN FOR CHOLESTEROL TRAPPING AND REGENERATION THEREOF

(75) Inventors: Hae-Soo Kwak, Seoul (KR); Song-Hee Kim, Seoul (KR); Jung Jwa Ahn, Seoul (KR)

(73) Assignee: Hae-Soo Kwak, Seoul (KR)

( * ) Notice: Subject to any disclaimer, the term of this patent is extended or adjusted under 35 U.S.C. 154(b) by 0 days.

(21) Appl. No.: 13/037,698

(22) Filed: Mar. 1, 2011

(65) Prior Publication Data

US 2011/0190487 A1 Aug. 4, 2011

Related U.S. Application Data (62) Division of application No. 11/258,750, filed on Oct. 26, 2005, now Pat. No. 7,919,130.

(51) Int. Cl.
 *C07H 1/00* (2006.01)

(52) U.S. Cl. ........ 426/480; 426/614; 426/417; 426/585; 426/586; 426/664; 426/330.2; 426/491; 426/422; 426/580; 426/581; 536/123.1

(58) Field of Classification Search ............... 426/480, 426/614, 417, 585, 586, 664, 330.2, 491, 426/422, 580, 581; 536/123.1
See application file for complete search history.

(56) References Cited

U.S. PATENT DOCUMENTS

| | | | |
|---|---|---|---|
| 5,037,661 A | 8/1991 | Merchant et al. | |
| 5,264,226 A | 11/1993 | Graille et al. | |
| 5,312,640 A | 5/1994 | Lombardo et al. | |
| 5,342,633 A * | 8/1994 | Cully et al. | 426/47 |
| 5,484,624 A | 1/1996 | Awad et al. | |
| 6,110,517 A | 8/2000 | Kwak et al. | |
| 6,129,945 A | 10/2000 | Awad et al. | |

FOREIGN PATENT DOCUMENTS

JP 10 195108 7/1998

OTHER PUBLICATIONS

Asanuma et al. PII. 1998. pp. 1-5.*
Kim et al. Asian Aust. J. Anim. Sci. 2005. vol. 1, No. 4. pp. 584-589.*
Kwak et al. Asain-Australasian Journal of Animal Science, 14 (2001), pp. 548-552.*
Kwak, et al. "Removal of Cholesterol from Cheddar Cheese by β-Cyclodextrin," J. Agric. Food Chem. 2002, 50, 7293-7298.
Shim, et al. "Functinoal Properties of Cholesterold-Removed Whipping Cream Treated by β-Cyclodextrin," J. Dairy Sci. 2003, 86: 2767-2772.
Kim, et al. "Crosslinking of β-Cyclodextrin on Cholesterol Removal from Milk," Arch Pharm Res. vol. 27, No. 121, 1183-122187, 2004.

* cited by examiner

*Primary Examiner* — Anthony Weier
(74) *Attorney, Agent, or Firm* — Ballard Spahr LLP

(57) ABSTRACT

Shown herein is the use of crosslinked beta-cyclodextrin as a trap for removing cholesterol. The crosslinked beta-cyclodextrin is prepared by crosslinking beta-cyclodextrin in the presence of a crosslinking agent. Treatment with the crosslinked beta-cyclodextrin results in cholesterol-depleted foods. After application to foods, the crosslinked beta-cyclodextrin which traps cholesterol therein can be readily regenerated with organic solvents. The crosslinked beta-cyclodextrin can be applied to almost all cholesterol-containing foods, such as dairy products, meat products, and egg products, with excellent cholesterol removal rates.

2 Claims, 1 Drawing Sheet

METHOD FOR CROSSLINKING BETA-CYCLODEXTRIN FOR CHOLESTEROL TRAPPING AND REGENERATION THEREOF

CROSS REFERENCE TO RELATED PATENT APPLICATIONS

This application is a divisional of application Ser. No. 11/258,750 filed on Oct. 26, 2005, now U.S. Pat. No. 7,919,130, the entirety of which is incorporated herein by reference.

BACKGROUND OF THE INVENTION

1. Field of the Invention

The present invention relates to the removal of cholesterol from foods using β-cyclodextrin (hereinafter referred to as "β-CD") as a trap. More particularly, the present invention relates to a method for trapping cholesterol from foods in crosslinked β-CD and recycling the cholesterol-trapped β-CD with an organic solvent.

2. Description of the Related Art

A strong positive correlation is reported to exist between blood cholesterol level and the risk of adult diseases in the circulatory system. For this reason, western foods, including milk, dairy products, other animal resourced foods, etc., that are rich in cholesterol have recently been the object of concern among people.

Most animal resourced foods have cholesterol. Its content is measured to be 219 mg/100 g of butter, 137 mg/100 g of 36% fat cream, 105 mg/100 g of cheddar cheese, 95 mg/100 g of cream cheese, 87.5 mg/100 g of blue cheese, 122.9 mg/100 g of fetta cheese, 112 mg/100 g of lard, and 1,050 mg/100 g of egg yolk.

The only way to prevent diseases resulting from the excessive intake of cholesterol is to consume low or zero-cholesterol foods. Active research into the physical, chemical and/or biological reduction of cholesterol in foods including dairy products has been conducted.

Figure 1:
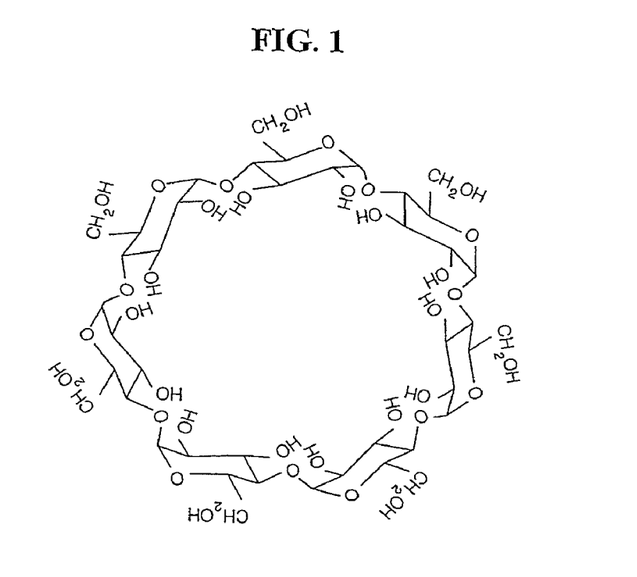
FIG. 1 is a chemical formula showing the structure of β-CD.

One of the most effective methods for the reduction of cholesterol content in dairy products is to use β-CD as an absorbent. This absorbent binds cholesterol to form a water-insoluble β-CD-cholesterol complex which can be readily centrifuged out.

β-CD is one of the circular α-(1,4)-linked oligosaccharides produced by the catalytic reaction of cyclodextrin-glycosyl-transferase, an enzyme found in microorganisms, with starch, and is nontoxic to the body (see FIG. 1). β-CD has a cavity at the center of its molecular arrangement, which forms an inclusion complex with various compounds including cholesterol. Also, beta-CD is nontoxic, edible, nonhygroscopic, chemically stable, and easy to separate from the complex. Therefore, β-CD is a suitable material for removing cholesterol from foods.

Figure 2:
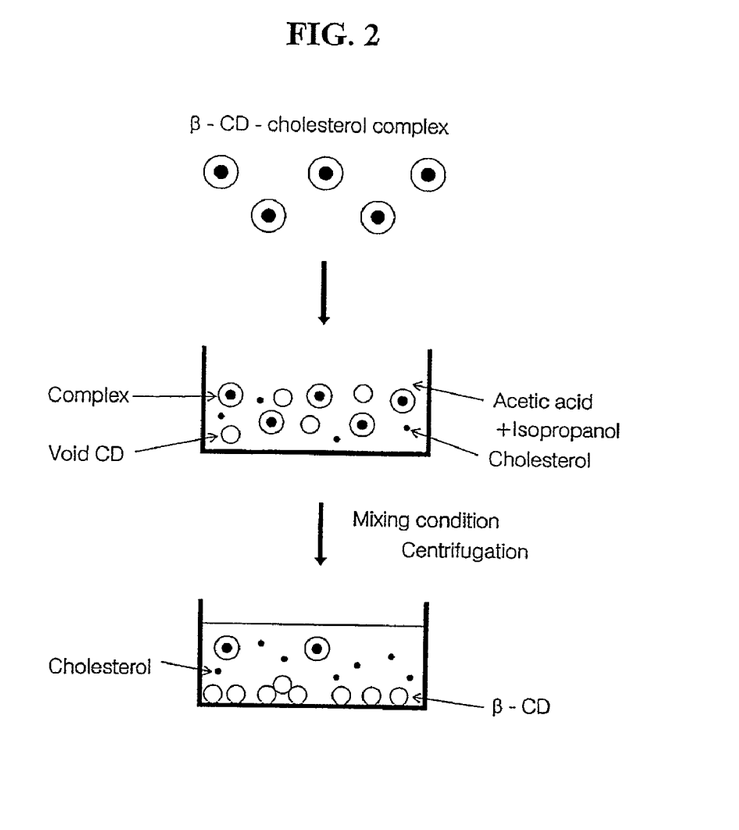
FIG. 2 is a view showing the procedure of regenerating crosslinked beta-cyclodextrin.

Beta-CD, although having the advantage of removing cholesterol from various foods at an efficiency of about 90% or higher, suffers from the disadvantages of being economically unfavorable and causing environmental pollution because of the consumption of lots of β-CD due to its ineffective recovery. To overcome these problems, the recovery and recycling of β-CD has been studied. Suggested was the use of organic solvents in recovering and recycling β-CD (see FIG. 2). However, β-CD can be recovered to some extent when applied to milk, but is difficult to separate from some foods, such as creams.

The use of β-CD in removing cholesterol is disclosed in many patents, for example, Korean Pat. Laid-Open Publication No. 1999-0015191, entitled "method for removing cholesterol from cream", No. 1999-0015192, entitled "method for cholesterol removal using immobilized cyclodextrin derivatives", No. 2004-0054319, entitled "method for preparing cholesterol-removed whipping cream", No. 2003-0078532, entitled "method for removing cholesterol from cheese", and No. 2003-0035341, entitled "cyclodextrin derivative immobilized on solid and preparation thereof". These techniques, however, have a poor removal rate and are not suitable for industrial application.

Therefore, there is a need for a method for removing cholesterol from foods with a great economical profit.

SUMMARY OF THE INVENTION

Leading to the present invention, intensive and thorough research into the economically profitable and industrially applicable removal of cholesterol from foods, conducted by the present inventors, resulted in the finding that crosslinked β-CD can remove cholesterol from a variety of foods at high efficiency and that the crosslinked β-CD-cholesterol complex thus formed can be readily recovered using organic solvents. The recovery of β-CD by use of an organic solvent is simple, economically favorable, and easily industrially applicable.

Therefore, it is an object of the present invention to provide a method for preparing crosslinked β-CD, which can trap cholesterol in its central cavity to reduce the level of cholesterol in foods.

It is another object of the present invention to provide a method for reducing the cholesterol level of foods at high efficiency at an economic profit.

It is a further object of the present invention to provide a method for reducing the cholesterol level of foods, which is environment-friendly.

In accordance with an aspect of the present invention, a method for preparing crosslinked beta-cyclodextrin for cholesterol removal, comprising crosslinking beta-cyclodextrin in the presence of a crosslinking agent is provided.

In this method, the crosslinking step comprises: suspending beta-cyclodextrin in distilled water; adding the crosslinking agent to the suspension, followed by adjusting the suspension to pH 10 with an alkaline solution, subjecting the beta-cyclodextrin to a crosslinking reaction at room temperature for 16 hours, and readjusting the reaction to pH 5 with an acidic solution; and filtering off crosslinked beta-cyclodextrin, followed by washing with water and drying.

In another aspect of the present invention, a method for removing cholesterol from food, comprising treating the cholesterol-containing food with beta-cyclodextrin to trap cholesterol in the beta-cyclodextrin, and separating the beta-cyclodextrin-cholesterol complex is provided.

In this method, the treating step is carried out by reacting the crosslinked beta-cyclodextrin with the cholesterol-containing food at 5-50° C. for 1-40 min with stirring at 50-1,600 rpm.

In accordance with a further aspect of the present invention, a method for regenerating crosslinked beta-cyclodextrin, the crosslinked beta-cyclodextrin having cholesterol trapped therein, comprising collecting the crosslinked beta-cyclodextrin in an organic layer, separating the organic layer, and evaporating the organic layer to give the crosslinked beta-cyclodextrin is provided.

In this method, the collecting step is carried out by mixing an organic solvent with the beta-cyclodextrin at 40-60° C. for 1-3 hours with stirring at 50-150 rpm, and the separating step is carried out by cooling the mixture to room temperature to separate layers and extricating the supernatant.

DESCRIPTION OF THE PREFERRED EMBODIMENTS

Crosslinking of β-CD can be achieved using a crosslinking agent, such as phosphorous, oxychloride, sodium trimetaphosphate, formaldehyde, adipic acid, etc. Of them, adipic acid can be added to foods without limitation because it is an additive that the U.S. FDA has approved as GRAS (Generally Recognized As Safe). Also, adipic acid has been identified as a usable sour tasting substance and a food preservative in the Korean Food Additives Code.

In the presence of alkali, adipic acid reacts with two hydroxyl groups of β-CD. That is, adipic acid forms intra- or intermolecular mono- or diether linkages with β-CD so as to crosslink β-CD.

As a crosslinking agent for β-CD, phosphoryl chloride or phosphorous oxychloride acts as follows:

In the presence of formaldehyde, β-CD is crosslinked as follows:

Test materials for cholesterol reduction in the present invention are commercially available milk (3.6% milk fat), cream (36% milk fat) that was prepared from raw milk supplied from Binggrae, Co. Ltd., Korea, using a cream separator, lard that was extracted from hog fat by thermal treatment, and egg yolk that was obtained from purchased eggs.

Other materials include isoamyl alcohol and sulfuric acid for the quantitative analysis of milk fat, cholesterol (99% purity), 5α-cholestane, both purchased from Sigma Chemical Co., and β-CD (purity 99.1%), obtained from Nihon Shokunin Cako Co. Ltd. (Osaka, Japan) for the construction of a standard curve, adipic acid (Acros Organics, USA) for β-CD crosslinking, and acetic acid and isopropanol, both 99.00% pure, for the recovery of β-CD.

Milk fat is determined by a Gerber test in which the lipid separated by centrifugation is measured with a divider.

For GC analysis, 1 g of a sample is mixed with 500 μl of a 1 ml internal standard (5α-cholestane 1 ml/ml 99.8% ethanol) in a screw-capped tube, followed by sapinification with 5 ml of a 2M ethanolic potassium hydroxide solution at 60° C. for 30 min with 5 mL of 2M ethanolic potassium hydroxide solution. After cooling the mixture to room temperature, cholesterol is extracted with 5 mL of hexane. This process is repeated four times.

The extract in a pool of the hexane layers is transferred to a round-bottomed flask and dried at 40° C. in a vacuum. The concentrate thus obtained is dissolved in 1 mL of hexane and is stored in a microtube. The injection volume of the sample is 2 μl for GC and the quantification of cholesterol can be done by comparing retention time and peak area between the sample cholesterol and the internal standard cholestane.

In accordance with a first aspect of the present invention, a method for preparing crosslinked β-CD through reaction with a crosslinking agent is provided.

The crosslinking agent suitable for crosslinking β-CD is selected from the group consisting of adipic acid, phosphorous oxychloride, sodium trimetaphosphate, and formaldehyde.

The preparation of crosslinked β-CD starts by suspending β-CD in distilled water. To the suspension is added a crosslinking agent, followed by adjusting the pH of the suspension to 10 with an alkaline solution. At room temperature, β-CD is subjected to crosslinking for 10-20 hours and preferably for 16 hours. The resulting reaction is adjusted to a pH value of 5 with an acidic solution. Then, the crosslinked β-CD is filtered off, washed and dried.

In accordance with a second aspect of the present invention, a method for reducing the cholesterol level of foods using the crosslinked β-CD is provided.

In the method, the crosslinked β-CD is used in an amount of 0.5-30 wt % of the weight of the cholesterol-containing food.

After the addition of the crosslinked β-CD, cholesterol is induced to be trapped within the crosslinked β-CD at 5 to 50° C. for 1 to 40 min with agitation at 50 to 1,600 rpm and then the crosslinked β-CD-cholesterol is separated.

Cholesterol-containing foods to which the method can be applied in the present invention may be dairy products, meat products, and egg products. In detail, milk, cream, butter, ice cream, yogurt, cheese, etc., are exemplary of the dairy products, lard and sausage of the meat products, and poultry eggs, egg yolk, and mayonnaise of the yolk products.

In accordance with a third aspect of the present invention, a method for recycling the crosslinked β-CD after its application for cholesterol removal is provided, in which an organic solvent is used to dissolve the crosslinked β-CD-cholesterol complex therein and the supernatant is separated and evaporated to recover crosslinked β-CD.

Suitable for the regeneration of β-CD in the present invention is a mixture of acetic acid and isopropanol in a volume ratio of 1:9 to 9:1, and more preferably 3:1. Butanol, hexane or ethanol, although able to regenerate β-CD, is inappropriate for use in food.

After trapping cholesterol in the crosslinked β-CD, an organic solvent is added and stirred at 50-150 rpm at 40-60° C. for 1-3 hours. After cooling to room temperature, the supernatant is separated and evaporated to recover β-CD.

A better understanding of the present invention may be obtained in light of the following examples which are set forth to illustrate, but are not to be construed to limit the present invention.

EXAMPLE 1

Preparation of Crosslinked β-CD

A suspension of 100 g of β-CD in 80 mL of distilled water was stirred at room temperature for 2 hours and added with adipic acid. This suspension was adjusted to pH 2 with 1M NaOH and then subjected to a crosslinking reaction for 16 hours at room temperature with stirring. Subsequently, the pH of the reaction was readjusted to 5.5 with acetic acid.

The crosslinking product was filtered out through a filter paper (Whatman No. 2), washed three times with 150 ml of distilled water, dried at 60° C. for 6 hours, and passed through a 100-mesh sieve to afford crosslinked β-CD.

EXAMPLE 2

Removal of Cholesterol from Milk by Crosslinked β-CD

1) Concentration of Crosslinked β-CD

To determine what amount of crosslinked β-CD is the most effective for reducing cholesterol in milk, crosslinked β-CD was added in amounts of 0.5, 1.0, 1.5, 2.0 and 2.5% by weight based on the weight of milk in consideration of the fact that only 1.85 g of β-CD is dissolved in 100 g of water at room temperature. Tests were done under the conditions of stirring at 800 rpm at 10° C. for 10 min and centrifuging at 175×g at 10° C. for 10 min.

Test results of cholesterol removal rate are given in Table 1, below. As seen in Table 1, the β-CD crosslinked through adipic acid was measured to remove cholesterol from milk at a maximal rate of 93.13% when used in an amount of 1% based on the weight of milk, at a minimal rate of 85.05% when used in an amount of 0.5%, and at intermediate rates of 93.02, 92.64 and 92.58% when used in amounts of 1.5, 2.0 and 2.5%, respectively.

TABLE 1

Cholesterol Removal Rate according to Crosslinked β-CD Concentration

| β-CD (%) | Cholesterol Removal Rate (%)[1] |
|---|---|
| 0.5 | 85.05 |
| 1.0 | 93.13 |
| 1.5 | 93.02 |
| 2.0 | 92.64 |
| 2.5 | 92.58 |

[1]no significance (P < 0.05), Cholesterol Removal Factors; Mixing temp 10° C., Stirring speed 800 rpm, Mixing time period 10 min, Milk fat 3.6%

2) Mixing Temperature

Generally, milk is kept at 4° C. or colder during storage and distribution. To examine the effect of temperature on cholesterol removal rate, milk was mixed with the β-CD crosslinked through adipic acid at various temperatures from zero to 20° C. and the results are given in Table 2, below.

The cholesterol removal rate was measured to increase with temperature: 85.14% at 0° C., 85.33% at 5° C., 92.38% at 10° C., 92.56% at 15° C., and 93.08% at 20° C. Although the highest cholesterol removal rate was at 20° C., it is believed that the optimal temperature to remove cholesterol from milk is 10° C. in consideration of the fact that milk is kept fresh at 4° C.

TABLE 2

Effect of Temperature on the Removal of Cholesterol from Milk by Crosslinked β-CD

| Mixing Temp. (° C.) | Cholesterol Removal Rate (%)[1] |
|---|---|
| 0 | 85.14 |
| 5 | 85.33 |
| 10 | 92.38 |
| 15 | 92.56 |
| 20 | 93.08 |

[1]no significance (P < 0.05) Cholesterol Removal Factors; Crosslinked β-CD 1%, Stirring speed 800 rpm, Mixing time 10 min, Cream fat content 3.6%

3) Mixing Time Period

The cholesterol removal rates of the crosslinked β-CD were examined in milk during various mixing time periods and the results are given in Table 3, below.

Cholesterol was removed at a maximum removal rate of 92.48% for a mixing period of 5 min. The cholesterol removal rate was measured to be 86.94% after 1 min of mixing, 92.01% after 10 min of mixing, 90.44% after 15 min of mixing and 90.42% after 20 min of mixing. Continuation beyond a threshold time had no additional influence on β-CD's ability to trap cholesterol therein and thus did not enhance the removal rate.

TABLE 3

Effect of Mixing Time Period on Cholesterol Removal of Crosslinked β-CD in Milk

| Mixing time period (min) | Cholesterol Removal Rates (%)[1] |
|---|---|
| 1 | 86.94 |
| 5 | 92.48 |
| 10 | 92.01 |
| 15 | 90.44 |
| 20 | 90.42 |

[1]no significance (P < 0.05) Cholesterol Removal Factors; Crosslinked β-CD 1%, Stirring speed 800 rpm, Mixing temp. 10° C., Cream fat content 3.6%

4) Stirring Speed

The crosslinked β-CD was tested for cholesterol removal rate according to stirring speeds and the results are given in Table 4, below.

Cholesterol was removed at a maximum removal rate of 92.05% at a stirring speed of 400 rpm. The cholesterol removal rate was measured to be 91.63% at 600 rpm, 90.81% at 800 rpm, 88.72% at 1,000 rpm, and 87.22% at 1,200 rpm. As for the reduction in cholesterol removal rate with the increase of stirring speed over 400 rpm, it is assumed that the stable state of the β-CD-cholesterol complex would be broken into an unstable state by excessive stirring.

In Example 2, the optimal conditions for the removal of cholesterol from milk by the β-CD crosslinked through adipic acid were found to be 1% for the amount of crosslinked β-CD, 10° C. for the mixing temperature, 5 min for the mixing time period and 400 rpm for the mixing speed, under which cholesterol was removed at an average rate of 92.39%.

TABLE 4

Effect of Stirring Speed on Removal of Cholesterol from Milk by Crosslinked β-CD

| Stirring speed (rpm) | Cholesterol Removal Rates (%)[1] |
|---|---|
| 400 | 92.05 |
| 600 | 91.63 |
| 800 | 90.81 |

TABLE 4-continued

Effect of Stirring Speed on Removal of Cholesterol
from Milk by Crosslinked β-CD

| Stirring speed (rpm) | Cholesterol Removal Rates (%)[1] |
|---|---|
| 1,000 | 88.72 |
| 1,200 | 87.22 |

[1] no significance (P < 0.05), Cholesterol Removal Factors; Crosslinked β-CD 1%, Mixing temp. 10° C., Mixing time 10 min, Cream fat content 3.6%

EXAMPLE 3

Removal of Cholesterol from Cream by Crosslinked β-CD

1) Concentration of Crosslinked β-CD

Cholesterol removal rates of the crosslinked β-CD were measured according to its amounts in cream and the results are given in Table 5, below.

When the β-CD crosslinked through adipic acid was used in an amount of 10% by weight based on the weight of cream, cholesterol was removed at a highest rate of 90.72%. The cholesterol removal rate was 81.73% at an amount of 1% of the crosslinked β-CD, 85.32% at an amount of 5%, 90.54% at an amount of 15%, and 89.98% at an amount of 20%.

TABLE 5

Cholesterol Removal Rate according to Crosslinked β-CD Concentration

| β-CD (%) | Cholesterol Removal Rates (%)[1] |
|---|---|
| 1 | 81.73 |
| 5 | 85.32 |
| 10 | 90.72 |
| 15 | 90.54 |
| 20 | 89.98 |

[1] no significance (P < 0.05), cholesterol removal factors; Mixing temp. 40° C., stirring speed 1400 rpm, mixing time 30 min, Cream fat content 36%

2) Mixing Temperature

To examine the effect of temperature on cholesterol removal rate, milk was mixed with the β-CD crosslinked through adipic acid at various temperatures from 40 to 60° C. and the results are given in Table 6, below.

The highest cholesterol removal rate was measured to be 91.03% at 40° C. From cream, cholesterol was removed at a rate of 90.56% at 45° C., 88.72% at 50° C., 86.32% at 55° C., and 85.01% at 60° C. Generally, cream is kept at 4° C. or less during storage and distribution. At low temperatures, cream increases in viscosity. In fact, the test is difficult to conduct at a temperature below 40° C. Therefore, the optimal temperature at which β-CD can remove cholesterol from cream is thought to be 40° C. It is assumed that the decrease in cholesterol removal rate with an increase in the mixing temperature is attributed to the fact that lipid is separated from cream at high temperatures and exists as an upper layer which has less opportunity to contact β-CD.

TABLE 6

Effect of Mixing Temperature on Removal of
Cholesterol from Cream by Crosslinked β-CD

| Mixing temp. (° C.) | Cholesterol Removal Rates (%)[1] |
|---|---|
| 40 | 91.03 |
| 45 | 90.56 |
| 50 | 88.72 |
| 55 | 86.32 |
| 60 | 85.01 |

[1] no significance (P < 0.05), Cholesterol Removal Factors; crosslinked β-CD 10%, stirring speed 1,400 rpm, mixing time 30 min, Cream fat content 3.6%

3) Mixing Time Period

The cholesterol removal rates of the crosslinked β-CD were examined in cream for various mixing time periods and the results are given in Table 7, below.

Cholesterol was removed at a maximum removal rate of 91.20% for a mixing period of 30 min. The cholesterol removal rate was measured to be 84.27% after 10 min of mixing, 85.05% after 20 min of mixing, 90.98% after 40 min of mixing and 90.64% after 50 min of mixing. Time elongation over a threshold level had no additional influence on β-CD's ability to trap cholesterol therein and thus did not enhance the removal rate.

TABLE 7

Effect of Mixing Time Period on Cholesterol Removal
of Crosslinked β-CD in Cream

| Mixing time (min.) | Cholesterol Removal Rates (%)[1] |
|---|---|
| 10 | 84.27 |
| 20 | 85.05 |
| 30 | 91.20 |
| 40 | 90.98 |
| 50 | 90.64 |

[1] no significance (P < 0.05), Cholesterol removal factors; crosslinked β-CD 10%, stirring speed 1,400 rpm, Mixing temp. 40° C., Cream fat content 3.6%

4) Stirring Speed

The crosslinked β-CD was tested for cholesterol removal rate according to stirring speeds and the results are given in Table 8, below.

Cholesterol was removed at a maximum removal rate of 92.74% at a stirring speed of 1,400 rpm. The cholesterol removal rate was measured to be 85.32% at 800 rpm, 87.49% at 1,000 rpm, 90.91% at 1,200 rpm, and 88.82% at 1,600 rpm. The cholesterol removal rate of crosslinked β-CD in cream increased with the increase in stirring speed. Also, it is assumed that a stirring speed of 1,600 rpm or higher causes lipids to separate from cream and exist as an upper layer, which has a little opportunity to contact β-CD.

TABLE 8

Effect of Stirring Speed on Removal of Cholesterol
from Cream by Crosslinked β-CD

| Stirring speed (rpm) | Cholesterol Removal Rates (%)[1] |
|---|---|
| 800 | 85.32 |
| 1,000 | 87.49 |
| 1,200 | 90.91 |
| 1,400 | 92.74 |
| 1,600 | 88.82 |

[1] no significance (P < 0.05), Cholesterol removal factors; crosslinked β-CD 10%, Mixing temp. 40° C., mixing time 30 min, Cream fat content 3.6%

In Example 3, the optimal conditions for the removal of cholesterol from cream by the β-CD crosslinked through adipic acid were found to be 10% for the amount of the crosslinked β-CD, 40° C. for the mixing temperature, 30 min for the mixing time period and 1,400 rpm for the mixing speed, under which cholesterol was removed at an average rate of 91.42%.

EXAMPLE 4

Removal of Cholesterol from Lard by Crosslinked β-CD

1) Concentration of Crosslinked β-CD

To determine what amount of crosslinked β-CD is the most effective for reducing cholesterol in lard, crosslinked β-CD was added in amounts of 1, 3, 5, 7 and 8% by weight based on the weight of lard. Tests were done under conditions of stirring at 150 rpm at 30° C. for 1 hr and centrifuging at 240×g at 27° C. for 15 min.

Test results of cholesterol removal rate are given in Table 9, below. As seen in Table 9, the β-CD crosslinked through adipic acid was measured to remove cholesterol from lard at a maximal rate of 93.02% when used in an amount of 5% by weight based on the weight of lard, at a minimal rate of 64.05% when used in an amount of 1%, and at intermediate rates of 85.13, 92.92 and 92.58% when used in amounts of 3, 7 and 9%, respectively.

TABLE 9

Cholesterol Removal Rate according to Crosslinked β-CD Concentration in Lard

| β-CD (%) | Cholesterol Removal Rates (%)[1] |
|---|---|
| 1 | 64.05 |
| 3 | 85.13 |
| 5 | 93.02 |
| 7 | 92.92 |
| 19 | 92.58 |

[1] no significance (P < 0.05), cholesterol removal factors; Mixing temp. 30° C., stirring speed 150 rpm, mixing time 1 hr, Lard 27%

2) Mixing Temperature

Lard is quickly solidified at temperatures lower than 10° C. Mixing tests were done at various temperatures higher than 10° C. in order to prevent quality degradation while keeping lard in a liquid phase. To examine the effect of temperature on cholesterol removal rate, milk was mixed with the β-CD crosslinked through adipic acid at various temperatures from 10 to 50° C., and the results are given in Table 10, below.

The highest cholesterol removal rate was measured to be 92.38% at 30° C. From cream, cholesterol was removed at a rate of 90.11% at 10° C., 90.322% at 20° C., 92.31% at 40° C., and 92.08% at 60° C.

TABLE 10

Effect of Temperature on the Removal of Cholesterol from Lard by Crosslinked β-CD

| Mixing temp. (° C.) | Cholesterol Removal Rates (%)[1] |
|---|---|
| 10 | 90.11 |
| 20 | 90.32 |
| 30 | 92.38 |
| 40 | 92.31 |
| 50 | 92.08 |

[1] no significance (P < 0.05), cholesterol removal factors; crosslinked β-CD 5%, stirring speed 150 rpm, mixing time 1 hr, Lard 27%

3) Mixing Time Period

The cholesterol removal rates of the crosslinked β-CD were examined in lard for various mixing time periods and the results are given in Table 11, below.

Cholesterol was removed at a maximum removal rate of 92.01% for a mixing period of 1 hr. The cholesterol removal rate was measured to be 87.14% after 0.5 hr of mixing, 91.47% after 1.5 hr of mixing, and 91.48% after 2.0 hr of mixing. Time elongation over a threshold level had no additional influence on β-CD's ability to trap cholesterol therein when compared to other conditions and thus did not enhance the removal rate.

TABLE 11

Effect of Mixing Time Period on Cholesterol Removal of Crosslinked β-CD in Lard

| Mixing time (hr) | Cholesterol Removal Rates (%)[1] |
|---|---|
| 0.5 | 87.14 |
| 1.0 | 92.01 |
| 1.5 | 91.47 |
| 2.0 | 91.47 |

[1] no significance (P < 0.05), Cholesterol removal factors; crosslinked β-CD 5%, stirring speed 150 rpm, Mixing temp. 30° C., Lard 27%

4) Stirring Speed

The crosslinked β-CD was tested for cholesterol removal rate in lard according to stirring speeds and the results are given in Table 12, below.

Cholesterol was removed at a highest removal rate of 93.11% at a stirring speed of 150 rpm. The cholesterol removal rate was measured to be 89.05% at 50 rpm, 90.48% at 100 rpm, 93.00% at 200 rpm, and 92.85% at 250 rpm. As for the reduction in cholesterol removal rate with the increase of stirring speed over 150 rpm, it is assumed that the stable state of β-CD-cholesterol complex would be broken into an unstable state by excessive stirring.

In Example 4, the optimal conditions for the removal of cholesterol from lard by the β-CD crosslinked through adipic acid were found to be 5% for the amount of the crosslinked β-CD, 30° C. for the mixing temperature, 1 hr for the mixing time period and 150 rpm for the mixing speed, under which cholesterol was removed at an average rate of 92.63%.

TABLE 12

Effect of Stirring Speed on Removal of Cholesterol from Lard by Crosslinked β-CD

| Stirring speed (rpm) | Cholesterol Removal Rates (%)[1] |
|---|---|
| 50 | 89.05 |
| 100 | 90.48 |
| 150 | 93.11 |
| 200 | 93.00 |
| 250 | 92.85 |

[1] no significance (P < 0.05), Cholesterol Removal Factors; Crosslinked β-CD 5%, Mixing temp. 30° C., Mixing time 1 hr, Lard 27%

EXAMPLE 5

Removal of Cholesterol from Egg Yolk by Crosslinked β-CD

1) Concentration of Crosslinked β-CD

To determine what amount of crosslinked β-CD is the most effective for reducing cholesterol amounts in egg yolk, crosslinked β-CD was added in amounts of 10, 15, 20, 25 and 30% by weight based on the weight of egg yolk in consideration of its excessive cholesterol content. Tests were done under the conditions of stirring at 800 rpm at 40° C. for 30 min and centrifuging at 520×g at 20° C. for 10 min. Test results of cholesterol removal rate are given in Table 13, below.

As seen in Table 13, the β-CD crosslinked through adipic acid was measured to remove cholesterol from milk at a maximal rate of 95.75% when used in an amount of 25% by weight based on the weight of egg yolk, at a minimal rate of 78.53% when used in an amount of 10%, and at mid rates of 82.73, 93.28 and 93.68% when used in amounts of 15, 20 and 30%, respectively. When economic profitability was considered, an optimal amount was 20%.

TABLE 13

Cholesterol Removal Rate according to Crosslinked β-CD Concentration in Egg Yolk

| β-CD (%) | Cholesterol Removal Rates (%)[1] |
|---|---|
| 10 | 78.53 |
| 15 | 82.73 |
| 20 | 93.28 |
| 25 | 95.75 |
| 30 | 93.68 |

[1] no significance (P < 0.05), Cholesterol Removal Factors; Mixing temp. 40° C., Stirring speed 800 rpm, Mixing time 30 min 2) Mixing Temperature To examine the effect of temperature on cholesterol removal rate, egg yolk was mixed with the β-CD at various temperatures and the results are given in Table 14, below.

From egg yolk, cholesterol was removed at a rate of 82.69% at 30° C., 87.99% at 35° C., 90.05% at 40° C., 88.07% at 45° C., and 88.15% at 50° C. Having the highest cholesterol removal rate, 40° C. was determined to be optimal.

TABLE 14

Effect of Temperature on the Removal of Cholesterol from Egg Yolk by Crosslinked β-CD

| Mixing temp. (° C.) | Cholesterol Removal Rates (%)[1] |
|---|---|
| 30 | 82.69 |
| 35 | 87.99 |
| 40 | 90.05 |
| 45 | 88.07 |
| 50 | 88.15 |

[1] no significance (P < 0.05) Cholesterol removal factors; Crosslinked β-CD 20%, Stirring speed 800 rpm, Mixing time 30 min 3) Mixing Time Period The cholesterol removal rates of the crosslinked β-CD were examined in egg yolk for various mixing time periods and the results are given in Table 15, below.

Cholesterol was removed at a highest removal rate of 91.49% for a mixing period of 30 min. The cholesterol removal rate was measured to be 84.54% after 10 min of mixing, 88.07% after 20 min of mixing, 91.39% after 40 min of mixing, and 78.92% after 50 min of mixing. Therefore, 30 min is determined to be optimal for removing cholesterol from egg yolk.

TABLE 15

Effect of Mixing Time Period on Cholesterol Removal of Crosslinked β-CD in Egg Yolk

| Mixing time (min.) | Cholesterol Removal Rates (%)[1] |
|---|---|
| 10 | 84.54 |
| 20 | 88.07 |
| 30 | 91.49 |
| 40 | 91.30 |
| 50 | 78.92 |

[1] no significance (P < 0.05) Cholesterol removal factors; Crosslinked β-CD 20%, Stirring speed 800 rpm, Mixing temp. 40° C.

4) Stirring Speed

The crosslinked β-CD was tested for cholesterol removal rate in egg yolk according to stirring speeds and the results are given in Table 16, below.

Cholesterol was removed at a highest removal rate of 91.64% at a stirring speed of 800 rpm. The cholesterol removal rate was measured to be 85.10% at 400 rpm, 90.50% at 600 rpm, 88.59% at 1,000 rpm, and 75.89% at 1,200 rpm.

TABLE 16

Effect of Stirring Speed on Removal of Cholesterol from Egg Yolk by Crosslinked β-CD

| Stirring speed (rpm) | Cholesterol Removal Rates (%)[1] |
|---|---|
| 400 | 85.10 |
| 600 | 90.50 |
| 800 | 91.64 |
| 1,000 | 88.59 |
| 1,200 | 75.89 |

[1] no significance (P < 0.05), Cholesterol Removal Factors; Crosslinked β-CD 20%, Mixing temp. 40° C., Mixing time 30 min 5) Dilution Factor The cholesterol removal rates of the crosslinked β-CD were examined in various dilutions of egg yolk in distilled water and the results are given in Table 17, below.

Cholesterol was removed at a highest removal rate of 94.55% when egg yolk was diluted in an equal volume of distilled water. The cholesterol removal rate was measured to be 76.52% in a mixture of 1:0.5 of egg yolk to distilled water, 93.24% in a mixture of 1:1.5 of egg yolk to distilled water, 93.53% in a mixture of 1:2 of egg yolk to distilled water, and 84.61% in a mixture of 1:3 of egg yolk to distilled water.

TABLE 17

Removal of Cholesterol from Egg Yolk by Crosslinked β-CD According to Dilution Factor

| Egg Yolk:Dilution Water | Cholesterol Removal Rates (%)[1] |
|---|---|
| 1:0.5 | 76.52 |
| 1:1 | 94.55 |
| 1:1.5 | 93.24 |
| 1:2 | 93.53 |
| 1:3 | 84.61 |

[1] no significance (P < 0.05) Cholesterol Removal Factors; crosslinked β-CD 20%, Mixing temp. 40° C., mixing time 30 min 6) Centrifugation Speed The cholesterol removal rates of crosslinked β-CD in egg yolk were examined at various centrifugation speeds and the results are given in Table 18, below. When centrifuging egg yolk at 460×g, crosslinked β-CD showed a highest cholesterol removal rate of 90.92%. The cholesterol removal rates were measured to be 89.60% at 400×g, 89.30% at 520×g, 89.27% at 580×g, and 7.88% at 640×g. 460×g is optimal for removing cholesterol from egg yolk.

In Example 5, the optimal conditions for the removal of cholesterol from egg yolk by the β-CD crosslinked through adipic acid were found to be 20% for the amount of the crosslinked β-CD, 1:1 for the dilution factor in distilled water, 40° C. for the mixing temperature, 30 min for the mixing time period, 800 rpm for the mixing speed, and 460×g for the centrifugation speed, under which cholesterol was removed at an average rate of 92.70%.

TABLE 18

Removal of Cholesterol from Egg Yolk by Crosslinked β-CD

| Centrifugation speed (xg) | Cholesterol Removal Rates (%)[1] |
|---|---|
| 400 | 89.60 |
| 460 | 90.92 |
| 520 | 89.30 |
| 580 | 89.27 |
| 640 | 87.88 |

[1]no significance (P < 0.05), Cholesterol Removal Factors; Crosslinked β-CD 20%, Mixing temp. 40° C., Mixing time 30 min

EXAMPLE 6

Recovery and Recycling of Crosslinked β-CD

To examine the recycling efficiency of crosslinked β-CD in milk and cream, β-CD-cholesterol complexes were recovered, mixed in a volume ratio of 6:1 with an organic solvent mixture (acetic acid:isopropanol=3:1), and treated for 10 min in an ultrasonic cleaner. While being stirred for 2 hours at 50° C. and 100 rpm, samples were withdrawn every 5 min and allowed to stand for 5 min.

The samples were cooled at room temperature and centrifuged at 630×g for 5 min to precipitate β-CD, followed by drying the precipitate at 50° C. for 6 hours in a dry oven to recover β-CD.

β-CD regenerated with organic solvents was tested for recycling efficiency in milk and the results are given in Table 19, below. After the first round of regeneration, the recycling efficiency of crosslinked β-CD was measured to be 100% or higher. Even after the fifth round of regeneration, the regenerated β-CD also showed a recycling efficiency of 100% or higher. Until the fifth round of regeneration, the regenerated β-CD was almost perfectly recycled. The recycling efficiency of the regenerated β-CD was 90.94% after the ninth round of regeneration and 88.13% after the tenth round of regeneration, with 97.30% on average in milk.

TABLE 19

Cholesterol Removal of Regenerated Crosslinked β-CD from Milk

| Regeneration Rounds | Recycling Efficiency (%) | Cholesterol Removal Rates (%)[1] |
|---|---|---|
| 1st | 100.13 | 92.51 |
| 2nd | 99.92 | 92.32 |
| 3rd | 99.72 | 92.13 |
| 4th | 99.81 | 92.21 |
| 5th | 100.03 | 92.42 |
| 6th | 99.39 | 91.83 |
| 7th | 98.04 | 90.58 |
| 8th | 96.88 | 89.51 |
| 9th | 90.94 | 84.02 |
| 10th | 88.13 | 81.42 |
| Avg. | 97.30 | 89.90 |

[1]no significance (P < 0.05).
Regeneration Conditions; Organic solvent (Acetic acid:Isopropanol = 3:1):β-CD = 6:1, Centrifugation speed 1,500 rpm, Centrifugation tim 5 min, Drying 6 hr, Fat content 3.6%

EXAMPLE 7

Removal of Cholesterol from Cream by Regenerated Crosslinked β-CD

Crosslinked β-CD regenerated as in Example 5 was applied to cream and the results are given in Table 20, below.

After the first round of regeneration, the recycling efficiency of crosslinked β-CD was measured to be 100% or higher. Also, after the third round of regeneration, the regenerated β-CD also showed a recycling efficiency of 100.02%. Thus, until the third round of regeneration, the regenerated β-CD was almost perfectly recycled. The recycling efficiency of the regenerated β-CD was 90.27% after the tenth round of regeneration, with as high as 97.82% on average in cream.

TABLE 20

Cholesterol Removal of Crosslinked β-CD Regenerated from Cream

| Regeneration Round | Recycling Efficiency (%) | Cholesterol Removal Rates (%)[1] |
|---|---|---|
| 1st | 100.03 | 91.45 |
| 2nd | 99.96 | 91.38 |
| 3rd | 100.02 | 91.44 |
| 4th | 98.94 | 90.45 |
| 5th | 98.91 | 90.42 |
| 6th | 99.19 | 90.68 |
| 7th | 97.79 | 89.40 |
| 8th | 97.57 | 89.20 |
| 9th | 94.55 | 86.44 |
| 10th | 90.27 | 83.40 |
| Avg. | 97.82 | 89.43 |

[1]no significance (P < 0.05)
Regeneration Conditions; Organic solvent (Acetic acid:Isopropanol = 3:1):β-CD = 6:1, Centrifugation speed 1,500 rpm, Centrifugation time 5 min, Drying 6 hr, Fat Content 3.6%

EXAMPLE 8

Yogurt

For the application of crosslinked β-CD to yogurt, crosslinked β-CD was added in an amount of 1% to milk, followed by stirring (10° C., 5 min, 400 rpm) and centrifugation (25° C., 10 min, 140×g). The milk was homogenized under a pressure of 1,000 psi at 50° C., and added with nonfat milk in an amount of 3.7% and with a starter culture in an amount of 0.02% at 40° C. The milk mixture was fermented at 43° C. for 6 hours in an incubator, stabilized at 10° C. for a day, and stored at 4° C. After being withdrawn, 1 g of the fermented milk was quantitatively analyzed using gas chromatography, and cholesterol was found to be removed therefrom at a rate of 91.38%.

EXAMPLE 9

Whipping Cream

From raw milk pasteurized at 72° C. for 15 min, cream was separated at 55° C., and standardized to cream with a lipid content of 36%. The cream was incubated overnight at 5° C., to which crosslinked β-CD was added in an amount of 10%, followed by stirring (40° C., 30 min, 1400 rpm) and centrifugation (25° C., 10 min, 140×g). Treatment with an emulsifier (α-cellulose 0.2%, avicell 0.2%, sodium alginate 0.2%, sugar ester 0.1%, sucrose 0.3%) was followed by homogenization at 60° C. under a pressure of 100 psi. The homogenized cream was cooled to 4° C. and ripened for 24 hours. Using EGS Type 06(E3290 Model 296, Germany), the cream was emulsified. Gas chromatography with 1 g of the cream showed the removal of cholesterol at a rate of 88.94%.

EXAMPLE 10

Butter

Crosslinked β-CD was added in an amount of 10% to cream with a lipid content of 36%, which was then stirred (40° C., 30 min, 1400 rpm). Centrifugation (25° C., 10 min, 140×g) was conducted to remove cholesterol and crosslinked β-CD from the cream. After incubation for one day, the cream was churned at 8-10° C. at a constant speed. When butter particles started to form, the churn was rotated for 10 turns at lower speed and then the resulting butter milk was egested. The churn was then washed at low speeds with cooling water as much as the egested butter milk. A pool of butter particles was mashed to completely remove water therefrom and salt was added in an amount of 1% to the butter. After being shaped in a mold, the butter was vaccum packed and stored at −20° C. Gas chromatographic analysis with 1 g of the butter showed cholesterol removal at a rate of 91.10%.

EXAMPLE 11

Cheddar Cheese

From raw milk pasteurized at 72° C. for 15 min, cream was separated at 55° C., and standardized to a fat content of 36%. Crosslinked β-CD was added in an amount of 10% times the amount of the cream to remove cholesterol, followed by centrifugation (25° C., 10 min, 140×g). The cholesterol-depleted cream was mixed with nonfat milk, homogenized under a pressure of 1,000 psi, uniformly mixed at 32° C. with a starter culture (0.004%), and allowed to stand for 30 min. The addition of 10% CaCl2 (0.03%) and rennet (0.19%) was followed by stagnation for 45 min. When appropriately formed, curds were cut and slowly stirred for 15 min and then heated at regular intervals to 38° C. for 30 min. When reaching an acidity of 0.15-0.17%, whey was drained. After curds were piled along the inner side of a cheese vat, a cheddaring process was repeated at 15 min intervals until the acidity reached 0.5%. After completion of the cheddaring process, the curds were milled, followed by the addition of salt in an amount of 2.0% thereto. The cheese curds were hooped overnight under a pressure of 2.5 kg/cm$^2$. The resulting cheese blocks were cut into predetermined sizes, vacuum packed, and ripened at 7° C.

Gas chromatography with 1 g of the cheddar cheese showed the removal of cholesterol at a rate of 88.24%.

EXAMPLE 12

Mozzarella Cheese

From the 3.6% fat raw milk pasteurized at 72° C. for 15 min, cream was separated at 55° C., and standardized to a fat content of 36%. Crosslinked β-CD was added in an amount of 10% times the amount of the cream to remove cholesterol, followed by stirring (40° C., 30 min, 1,400 rpm) and centrifugation (25° C., 10 min, 140×g). The β-CD-treated cream was mixed with nonfat milk, homogenized under a pressure of 70 kg/cm$^2$, uniformly mixed at 20° C. with 0.004% of a starter culture and 0.03% of 10% CaCl$_2$, and allowed to stand for 30 min. The addition of 0.019% of rennet was followed by stagnation for 30 min to form curds which were then cut using a curd knife and allowed to stand for 15 min. The curd mass was heated at 45° C. for 40 min. When reaching an acidity of 0.18-0.19%, whey was drained. Whenever whey acidity became 0.23%, the cheese curds were washed with the same amount of water, warmed to 45° C., as the amount of the whey drained. To a whey acidity of 0.5%, the curds were turned over at 15 min intervals, followed by heating to 75° C. The curds were strung for about 10 min and cooled to 4° C. for 2 hours. After being soaked for 2 hours in a 23% saline solution, the curd mass was vacuum packed and stored at 4° C.

Gas chromatography with 1 g of the mozzarella cheese showed the removal of cholesterol at a rate of 86.98%.

EXAMPLE 13

Cream Cheese

Raw milk was pasteurized at 72° C. for 15 sec and cream was separated therefrom at 55° C. The cream was standardized to a fat content of 36% and mixed with 10% of crosslinked β-CD with stirring (40° C., 30 min, 1400 rpm), followed by centrifugation (25° C., 10 min, 140×g). This cream was again standardized, to a fat content of 11%, and homogenized at 50° C. under a pressure of 680 psi. After cooling to 30° C., the cream was mixed with 0.05% of a starter culture and allowed to stand for 30 min. The addition of 0.005% of rennet and 0.03% of CaCl$_2$ was followed by stagnation for 30 min. The resulting curd was cut using a cutting knife, and incubated at 30° C. for 6 hours until the acidity of whey reached pH 4.7. Following thermal treatment at 45° C. for 20 min, whey was drained, and the curds were turned over 1 and 2 hours after the drainage. Incubation was conducted at 28° C. for 4 hours and then at 20° C. overnight. 1% of salt was added before storage at 4° C.

Gas chromatography with 1 g of the cream cheese showed the removal of cholesterol at a rate of 91.36%.

EXAMPLE 14

Blue Cheese

Raw milk was pasteurized at 72° C. for 15 sec and cream was separated at 55° C. therefrom. The cream was standardized to a fat content of 36% and mixed with 10% of crosslinked β-CD with stirring (40° C., 30 min, 1400 rpm), followed by centrifugation (25° C., 10 min, 140×g). Again, this cream was homogenized primarily under a pressure of 500 psi and then secondarily under a pressure of 1,000 psi. The cream was mixed with nonfat milk and 2% of a starter culture, and allowed to stand for 1 hour. The addition of 0.0154% of rennet was followed by stagnation for 30 min. Using a curd knife, the resulting curd was cut to predetermined sizes. They were heated at 30° C. until the acidity of whey increased to 0.03%. During heating, the curds were stirred every five min, and heated to 33° C. just before the drainage of whey. 2% of salt and 0.061% of Penicillium roqueforti were added to the curds which were then turned over at 15 min intervals for 2 hours. After overnight incubation, the curds were salted four or more times for 5 days. 6 days after incubation, the cheese was wrapped with cryovac, punctured in a diameter of 0.3 cm thereon using a needle, and rewrapped. At a suitable ripening time, the cheese was rewrapped with aluminum foil and stored at 2.2° C.

Gas chromatography with 1 g of the blue cheese showed the removal of cholesterol in a rate of 89.26%.

EXAMPLE 15

Fetta Cheese

Raw milk was pasteurized at 72° C. for 15 sec and cream was separated therefrom at 55° C. The cream was standardized, to a fat content of 36%, and mixed with 10% of crosslinked β-CD with stirring (40° C., 30 min, 1400 rpm), followed by centrifugation (25° C., 10 min, 140×g). This cream was again standardized, to a fat content of 5%, and homogenized under a pressure of 500 psi. After cooling to 32° C., the cream was mixed with 0.02% of a starter culture. One hour later, the addition of 0.02% of rennet was followed by stagnation for 30 min. The resulting curd was cut using a cutting knife, allowed to stand for 20 min, and stirred well for 20 min. After incubation to pH4.6, the curd was squeezed in a vessel for 20 hours. The curd was cut into predetermined sizes, soaked in a 23% saline solution, and sprinkled with rough salt particles in an amount of 14% before ripening for 2-3 months.

Gas chromatography with 1 g of the fetta cheese showed the removal of cholesterol at a rate of 90.86%.

EXAMPLE 16

Ice Cream

Cream with a fat content of 26% was mixed with 10% of crosslinked β-CD with stirring (40° C., 30 min, 1400 rpm), followed by centrifugation (25° C., 10 min, 140×g). In a mix tank maintained at 50° C., the cream was mixed with nonfat milk powder, sugar, a stabilizer (carboxymethyl cellulose), and water. The mixture was pasteurized at 72° C. for 15 min and homogenized at 60° C. in two stages ($1^{st}$; 175 kg/cm$^2$, $2^{nd}$; 35 kg/cm$^2$), followed by ripening at 4° C. for 24 hours. In an ice cream freezer, the ice cream was maintained at −3.8° C. for 7 min, packed at −20° C., and set at −26° C. for 2 hours before storage at −20° C. for a couple of weeks.

Gas chromatography with 1 g of the ice cream showed the removal of cholesterol at a rate of 88.46%.

EXAMPLE 16

Sausage

Lard was used as a material for sausages. 100 g of lard was mixed with 5% of crosslinked β-CD and with an equal amount of water. After stirring at 27° C. at 150 rpm for 1 hour, centrifugation was conducted at 230×g for 15 min to extract cholesterol-depleted lard. To this lard were added 2% of NaCl and a coloring agent (0.1% of $KNO_3$ and 0.01% of $NaNO_2$). After storage at 4° C. for 3 days, the solidified lard was ground at 10° C. or lower. In a cold bowl, the lard was mixed with 20% of chilled water and cut at 10° C. for 10 min. This material was well mixed with spice, binders, seasonings, antioxidants, and edible colorants, and then with 5% of corn starch. Mixing was conducted carefully for 10 min so that air did not infiltrate. When the mixture started to be viscous, the mixing was terminated. The resulting mixture was cased with Kureharon casing film, thermally treated at 63° C. for 30 min, and vacuum packed at 4° C.

Gas chromatography with 1 g of the sausage showed the removal of cholesterol at a rate of 92.02%.

EXAMPLE 17

Mayonnaise

Brown eggs were separated into egg yolk and egg white, and the egg yolk was passed through a 50 mesh sieve to remove the vitteline membrane and chalazae. The naked egg yolk was diluted in an equal volume of distilled water, mixed with 10% of crosslinked β-CD at 20° C. for 10 min with stirring at 400 rpm, and centrifuged at 20° C. at 140×g for 10 min to remove the β-CD-cholesterol complexes. Using a blender, 140 g of the cholesterol-depleted egg yolk was mixed with small amounts of sugar and salt and then with 800 ml of soybean oil and 35 ml of vinegar in an alternating manner. After completion of the emulsification, blending was conducted at a low speed to afford mayonnaise.

Gas chromatography with 1 g of the mayonnaise showed the removal of cholesterol at a rate of 87.90%.

Treatment with the crosslinked β-CD prepared according to the present invention, as described hereinbefore, can remove cholesterol in maximal amounts of 93% from milk, 91% from cream, 93% from lard, and 95% from egg yolk. In addition, the crosslinked β-CD trapping cholesterol therein can be regenerated using an organic solvent according to the present invention, showing excellent cholesterol removal rates of 90% after the $7^{th}$ round of regeneration and as high as 81% after the $10^{th}$ round of regeneration in milk and cholesterol removal rates of 90% after the $6^{th}$ round of regeneration and 83% even after the $10^{th}$ round of regeneration in cream.

Therefore, the present invention provides an economically profitable cholesterol removal method because it prevents the environmental pollution and cost increase attributed to the disposal of β-CD after a single use.

Furthermore, the present invention can contribute to the health of people by providing cholesterol-reduced food products, such as dairy products, meat products, egg products, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for regenerating a crosslinked beta-cyclodextrin, the crosslinked beta-cyclodextrin having cholesterol trapped therein, comprising collecting the crosslinked beta-cyclodextrin in an organic layer formed of a mixture of acetic acid and isopropanol, separating the organic layer, and evaporating the organic layer to give the crosslinked beta-cyclodextrin.

2. The method as set forth in claim 1, wherein the collecting step is carried out by mixing an organic solvent with the beta-cyclodextrin at 40-60° C. for 1-3 hours with stirring at 50-150 rpm, and the separating step is carried out by cooling the mixture to room temperature to separate layers and extricating the supernatant.

* * * * *